(12) United States Patent
Kaneko et al.

(10) Patent No.: US 7,773,123 B2
(45) Date of Patent: Aug. 10, 2010

(54) IMAGE PICKUP APPARATUS AND CONTROL UNIT THEREFOR

(75) Inventors: Katsumi Kaneko, Kanagawa (JP); Masaharu Tomura, Kanagawa (JP)

(73) Assignee: Sony Corporation, Toyko (JP)

( * ) Notice: Subject to any disclaimer, the term of this patent is extended or adjusted under 35 U.S.C. 154(b) by 1293 days.

(21) Appl. No.: 10/892,633

(22) Filed: Jul. 16, 2004

(65) Prior Publication Data

US 2005/0068424 A1 Mar. 31, 2005

(30) Foreign Application Priority Data

Jul. 18, 2003 (JP) ............................. 2003-276802

(51) Int. Cl.
H04N 5/228 (2006.01)
H04N 5/225 (2006.01)
H04N 5/00 (2006.01)

(52) U.S. Cl. ............................. 348/222.1; 348/207.99; 348/207.1; 386/128

(58) Field of Classification Search .............. 348/222.1, 348/14.1, 207.1, 207.11; 386/129; 600/109
See application file for complete search history.

(56) References Cited

U.S. PATENT DOCUMENTS 5,371,535 A * 12/1994 Takizawa .................... 348/14.1
5,786,851 A * 7/1998 Kondo et al. .............. 348/222.1
7,274,389 B1 * 9/2007 Hieda ....................... 348/207.1

FOREIGN PATENT DOCUMENTS

| JP | 63 136775 | 6/1988 |
| JP | 4 288778 | 10/1992 |
| JP | 7 298112 | 11/1995 |
| JP | 11 32241 | 2/1999 |
| JP | 2002 320203 | 10/2002 |

* cited by examiner

*Primary Examiner*—Yogesh K Aggarwal
*Assistant Examiner*—Selam Gebriel
(74) *Attorney, Agent, or Firm*—Frommer Lawrence & Haug LLP; William S. Frommer; Ellen Marcie Emas

(57) ABSTRACT

In an image pickup apparatus, an image signal generator generates an imaging signal DVb representing a variable frame rate image, and also, a synchronizing signal generator generates a synchronizing signal for generating the imaging signal DVb. When a playback image signal DVr is supplied from a control unit, the synchronizing signal generator is self-driven. Even when the frame rate of the playback image signal DVr is different from the frame rate of the imaging signal DVb, the imaging signal DVb and the playback image signal DVr can be output from the image pickup apparatus as monitor image signals VFout and MTout. When a reference synchronizing signal SYref is supplied instead of the playback image signal DVr, the synchronizing signal generator is operated in synchronization with the reference synchronizing signal SYref so as to output the imaging signal DVb synchronized with the reference synchronizing signal SYref.

16 Claims, 4 Drawing Sheets

FIG. 2

| VARIABLE FRAME RATE FRc | NUMBER OF FRAMES ADDED FA | IMAGING FRAME RATE FRp = FRc × FA |
|---|---|---|
| 60P ≧ FRc > 30P | 1 | 60P ≧ FRp > 30P |
| 30P ≧ FRc > 20P | 2 | 60P ≧ FRp > 40P |
| 20P ≧ FRc > 15P | 3 | 60P ≧ FRp > 45P |
| 15P ≧ FRc > 12P | 4 | 60P ≧ FRp > 48P |
| 12P ≧ FRc > 10P | 5 | 60P ≧ FRp > 50P |
| 10P ≧ FRc > 6P | 6 | 60P ≧ FRp > 36P |
| 6P ≧ FRc > 5P | 10 | 60P ≧ FRp > 50P |
| 5P ≧ FRc > 4P | 12 | 60P ≧ FRp > 48P |
| 4P ≧ FRc > 3P | 15 | 60P ≧ FRp > 45P |
| 3P ≧ FRc > 2P | 20 | 60P ≧ FRp > 40P |
| 2P ≧ FRc > 1P | 30 | 60P ≧ FRp > 30P |
| 1P | 60 | 60P |

IMAGE PICKUP APPARATUS AND CONTROL UNIT THEREFOR

BACKGROUND OF THE INVENTION

1. Field of the Invention

The present invention relates to an image pickup apparatus and a control unit therefor. More particularly, the invention relates to an image pickup apparatus, which is suitable for the production of movies or broadcast programs, that can output a first image signal and a second image having different frame rates together, for example, a variable frame rate image and a playback image. The invention also pertains to a control unit for the above type of image pickup apparatus.

2. Description of the Related Art

Conventionally, in film production, to achieve special video effects, filming is performed while changing the speed of filming with a film camera, that is, changing the number of frames per second. For example, when filming is performed faster than normal speed and when playback operation is performed at normal speed, slow-motion playback images can be obtained. With this technique, high speed operation, such as a scene in which droplets are falling onto a water surface, can be easily and meticulously observed. Conversely, when filming is performed slower than normal speed and when playback operation is performed at normal speed, fast-motion playback images can be obtained. With this technique, a sense of speed in, for example, battle scenes or car chase scenes, can be increased so that the scenes become more realistic and have a greater impact.

In television program production, imaging, editing, and transmission of programs is being digitized. Due to the development of digital technologies, the image quality is becoming higher and the cost of devices for producing programs is becoming lower, and digitization of film production is also improving.

Because of the digitization of television programs or film production, when imaging with an image pickup apparatus (video camera), the frame rate can be changed to easily obtain special video effects, for example, fast-motion playback operation or slow-motion playback operation. Such an image pickup apparatus is disclosed in, for example, Japanese Unexamined Patent Application Publication No. 2000-125210. When imaging at a frame rate lower than a predetermined frame rate by using this image pickup apparatus and when performing playback at the predetermined frame rate, fast-motion playback images can be easily obtained. In contrast, when imaging at a frame rate higher than a predetermined frame rate and when performing playback at the predetermined frame rate, slow-motion playback images can be easily obtained.

When recording an image signal generated by imaging a subject at a variable frame rate on a recording medium, such as a video tape or an optical disc, the operator checks whether a desired image has been recorded with an image pickup apparatus. In this case, an image signal DVr obtained by playing back the recording medium is supplied to the image pickup apparatus, and then, the image pickup apparatus is operated in synchronization with the image signal DVr. Then, the image based on the image signal DVr is displayed on an electronic viewfinder or a monitor connected to the image pickup apparatus.

When the frame rate of the image signal obtained by picking up a subject image (hereinafter such an image signal is sometimes referred to as an "imaging signal") is different from that of the image signal DVr obtained by playing back the recording medium (hereinafter such an image signal is sometimes referred to as a "playback image signal"), the imaging signal cannot be generated or displayed since the image pickup apparatus is operated in synchronization with the playback image signal DVr while the recorded image is being checked. Accordingly, the image frame adjustment or focus adjustment cannot be performed in advance by displaying the variable frame rate image while checking the recorded image.

SUMMARY OF THE INVENTION

Accordingly, it is an object of the present invention to provide an image pickup apparatus that can generate and display a variable frame rate image while displaying an image having a frame rate different from the variable frame rate image, and also to provide a control unit for such an image pickup apparatus.

In order to achieve the above-described object, according to one aspect of the present invention, there is provided an image pickup apparatus including: an image signal generating portion for generating a first image signal representing a variable frame rate image; and a synchronizing signal generating portion for generating a synchronizing signal used for generating the first image signal. When receiving from an external source a second image signal having a frame rate different from a frame rate of the first image signal, the synchronizing signal generating portion is self-driven to generate the synchronizing signal.

According to another aspect of the present invention, there is provided an image pickup apparatus including: an image signal generating portion for generating a first image signal representing a variable frame rate image; a synchronizing signal generating portion for generating a synchronizing signal used for generating the first image signal; and a controller for controlling operations of the image signal generating portion and the synchronizing signal generating portion. When receiving a second image signal from an external source, the controller allows the synchronizing signal generating portion to be self-driven to generate the synchronizing signal.

According to still another aspect of the present invention, there is provided an image pickup apparatus for use in an image pickup system including the image pickup apparatus and a unit to be controlled by the image pickup apparatus. The image pickup apparatus includes: an image signal generating portion for generating a first image signal representing a variable frame rate image; a synchronizing signal generating portion for generating a synchronizing signal used for generating the first image signal and for supplying the synchronizing signal to the image signal generating portion; and a controller for controlling operations of the image signal generating portion, the synchronizing signal generating portion, and the unit to be controlled. The controller controls the unit to be controlled to supply a second image signal to the image pickup apparatus, and allows the synchronizing signal generating portion to be self-driven to generate the synchronizing signal.

According to a further aspect of the present invention, there is provided a control unit for use in an image pickup system including: an image pickup apparatus including an image signal generating portion for generating a first image signal representing a variable frame rate image and a synchronizing signal generating portion for generating a synchronizing signal for operating the image signal generating portion; and the control unit for controlling the image pickup apparatus. The control unit includes a controller for controlling operations of the image signal generating portion and the synchronizing signal generating portion of the image pickup apparatus. The controller allows the synchronizing signal generating portion to be self-driven to generate the synchronizing signal by supplying a second image signal to the image pickup apparatus.

According to the present invention, in the image pickup apparatus, the image signal generating portion generates the first image signal representing a variable frame rate image, and also, the synchronizing signal generating portion generates a synchronizing signal used for generating this first image signal. When the second image signal is supplied from an external device, the control unit, or the unit to be controlled, the synchronizing signal generating portion is self-driven. Accordingly, even when the frame rate of the second image signal is different from the frame rate of the first image signal, the first image signal and the second image signal can be output as the first and second monitor image signals, respectively. When the reference synchronizing signal is supplied instead of the second image signal, the synchronizing signal generating portion is operated in synchronization with the reference synchronizing signal, the first image signal synchronized with the reference synchronizing signal can be output.

A delay compensating portion for compensating for a delay to be generated during communication with the image pickup apparatus and a delay compensation driving portion for generating a drive signal for driving the delay compensating portion may be provided. In this case, when the second image signal is supplied to the image pickup apparatus, the delay compensation driving portion is self-driven to generate the drive signal corresponding to the frame rate of the second image signal. Accordingly, the second image signal without a delay can be supplied to the image pickup apparatus. When the reference synchronizing signal is supplied to the image pickup apparatus instead of the second image signal, the delay compensation driving portion generates the drive signal synchronized with the reference synchronizing signal. Accordingly, the reference synchronizing signal without a delay can be supplied to the image pickup apparatus, and also, the first image signal synchronized with the reference synchronizing signal without a delay can be received from the image pickup apparatus.

BRIEF DESCRIPTION OF THE DRAWINGS

FIG. 2 illustrates the relationship of the number of frames added and the imaging frame rate to the variable frame rate;

DESCRIPTION OF THE PREFERRED EMBODIMENTS

Figure 1:
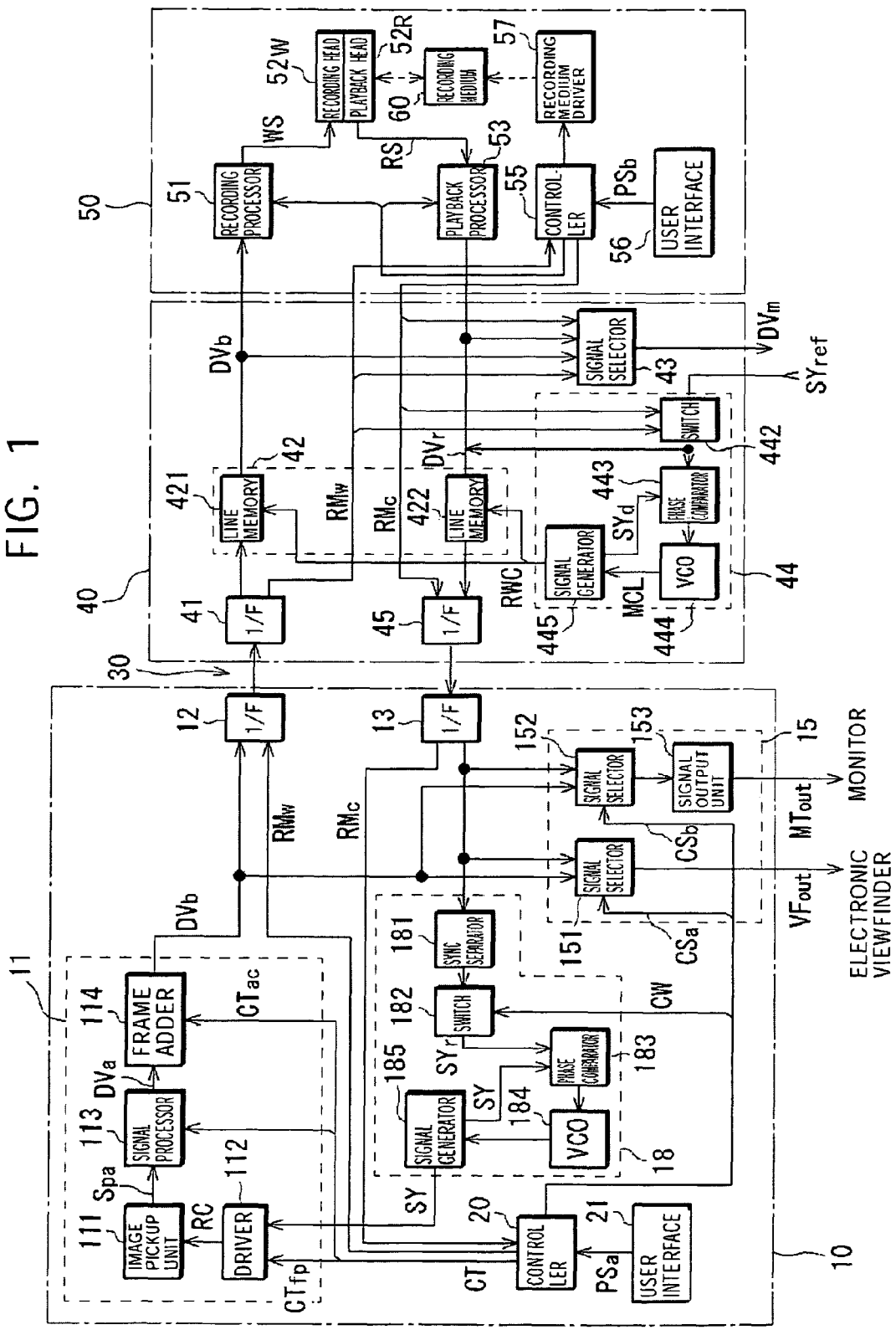
FIG. 1 is a block diagram illustrating an example of the configuration of an image pickup system.

The present invention is described in detail below with reference to the accompanying drawings through illustration of a preferred embodiment. An image pickup system shown in FIG. 1 includes an image pickup apparatus 10, a camera controller 40, and a recorder/player 50. In this image pickup system, the camera controller 40 and the recorder/player 50 form a control unit for controlling the image pickup apparatus 10.

In the image pickup apparatus 10, on the imaging surface of an image pickup device (not shown) forming an image pickup unit 111 of an image signal generator 11, an image of a subject generated from light incident on the imaging surface through an imaging lens (not shown) is formed. The image pickup device photoelectrically converts the subject image into imaging electric charge, and further converts the imaging electric charge into a voltage signal based on a drive control signal RC supplied from a driver 112. The image pickup device then supplies this voltage signal to an imaging signal processor 113 as an imaging signal Spa.

The driver 112 generates the drive control signal RC based on a control signal CT supplied from a controller 20 and a synchronizing signal SY supplied from a synchronizing signal generator 18, which are described below, and supplies the drive control signal RC to the image pickup unit 111.

The imaging signal processor 113 amplifies the imaging signal Spa and then removes noise components from the signal Spa. The imaging signal processor 113 then converts the image signal into a digital signal, and performs, for example, feedback clamping, flare correction, correction for defects of the image pickup device, and processing operations on the digital signal, so as to generate an image signal DVa. The image signal DVa is then supplied to a frame adder 114. The signal processing operation performed by the imaging signal processor 113 is controlled based on the control signal CT supplied from the controller 20.

The frame adder 114 performs frame addition on the image signal DVa by using random access memories (RAMs) so as to change the frame rate of the image signal DVa. If, for example, three frames are added, the first frame of the image signal DVa is stored in a RAM-1. Then, the signal stored in this RAM-1 is read out and is added to the second frame of the image signal DVa, and the resulting addition signal is stored in a RAM-2. The addition signal stored in the RAM-2 is then read out and is added to the third frame of the image signal DVa, and the resulting addition signal is stored in a RAM-3. The signal stored in the RAM-3 is a signal obtained by adding three frames of the image signal DVa, and if the level of this signal is multiplied by ⅓, a signal having a required level with ⅓ the frame rate can be obtained.

Similarly, the fourth frame of the image signal DVa is stored in the RAM-1. Then, the signal stored in the RAM-1 is read out and is added to the fifth frame of the image signal DVa, and the resulting addition signal is then stored in the RAM-2. The addition signal stored in the RAM-2 is read out and is added to the sixth frame of the image signal DVa, and the resulting addition signal is then stored in the RAM-3. The signal stored in the RAM-3 is a signal obtained by adding three frames of the image signal DVa, and if the level of this signal is multiplied by ⅓, a signal having a required level with ⅓ the frame rate can be obtained. Thereafter, similarly, image signals obtained by adding three frames of the image signal DVa and having a required level can be sequentially generated.

If the above-described image signals are read out at a predetermined output frame rate, the resulting imaging signal DVb having the predetermined output frame rate contains images that are picked up at a frame rate obtained by multiplying the frame rate of the image signal DVa by ⅓.

The above-described frame addition can also be performed by using a frame delay circuit. For example, the first frame of the image signal DVa is delayed by two frame periods in the frame delay circuit, and then, the second frame of the image signal DVa is delayed for one frame period in the frame delay circuit. The delayed first frame and second frame of the image signal DVa are then added to the third frame of the image signal DVa, thereby obtaining the three added frames of the image signal DVa. If this signal is read out at a predetermined frame rate, for example, in synchronization with the synchronizing signal SYb supplied from the controller 20, and then, if the level of this signal is multiplied by ⅓, the resulting imaging signal DVb having the predetermined output frame rate contains images that are picked up at a frame rate obtained by multiplying the frame rate of the image signal DVa by ⅓.

By performing the frame addition as described above, when the frame rate of the image signal DVa is 60P (which means that there are 60 frames per second and P indicates a progressive-scanning signal and the same applies to other indications), if the number of frames added is two and if the imaging signal DVb is read out at the output frame rate 60P, the resulting image signal contains images having the frame rate 30P. If the number of frames added is four, the resulting image signal contains images having the frame rate 15P.

In addition to the switching of the number of frames added, the signal to be read out from the image pickup device can be controlled so as to change the frame rate of the imaging signal Spa. Then, the frame rate of the image signal can be sequentially changed. As a result, the image signal of the predetermined output frame rate contains images that are picked up at a desired frame rate.

When changing the frame rate of the imaging signal Spa, the electric charge storage period in the image pickup device or the reading timing of the electric charge can be controlled by the drive control signal RC supplied to the image pickup unit 111 from the driver 112. When changing the imaging-frame rate FRp, a common data rate (CDR) common sampling frequency) system can be used for adjusting the horizontal blanking period or the vertical blanking period. With this arrangement, the image size of the imaging signal Spa in the effective frame period is not changed even if the imaging frame rate FRp is varied. With the use of the CDR system, the operating frequencies of the elements using the imaging frame rate FRp do not have to be changed even if the imaging frame rate FRp is varied. Thus, the configuration of the image pickup apparatus 10 can be simplified.

The imaging signal DVb generated in the frame adder 114 as described above is supplied to an interface 12 and signal selectors 151 and 152 of a monitor output unit 15.

The interface 12, which is connected to an interface 41 of the camera controller 40 via a transmission channel 30, supplies the imaging signal DVb and communication information RMw output from the controller 20 to the camera controller 40.

An interface 13, which is connected to an interface 45 of the camera controller 40 via a transmission channel 30, supplies an image signal DVr output from the camera controller 40 to the signal selectors 151 and 152 of the monitor output unit 15 and a synchronizing separator 181 of the synchronizing signal generator 18.

The signal selector 151 selects the imaging signal DVb or the image signal DVr based on a selection signal CSa from the controller 20, and outputs the selected signal to an electronic viewfinder as a monitor image signal VFout. The signal selector 152 selects the imaging signal DVb or the image signal DVr based on a selection signal CSb from the controller 20, and outputs the selected signal to an signal output unit 153. The signal output unit 153 converts the supplied image signal into a signal compatible with the format of a monitor connected to the image pickup apparatus 10, and outputs the converted signal as a monitor image signal MTout.

The synchronizing separator 181 separates the synchronizing signal from the signal supplied via the interface 13 and supplies the separated synchronizing signal to a phase comparator 183 via a switch 182. The phase comparator 183 compares the phase of a synchronizing signal SY generated in a signal generator 185 with the phase of the synchronizing signal SYc supplied via the switch 182 to determine a phase error, and controls the frequency of a reference oscillation signal MCK generated in a voltage-controlled oscillator (VCO) 184 so that the phase error of the two signals can be eliminated. The reference oscillation signal MCK generated in the VCO 184 is supplied to the signal generator 185. The signal generator 185 generates the synchronizing signal SY based on the reference oscillation signal MCK supplied from the VCO 184, and supplies the synchronizing signal SY to the driver 112 and the phase comparator 183. In this case, the synchronizing signal SY and the synchronizing signal SYc are synchronized with each other.

If the synchronizing signal SYc is not supplied to the phase comparator 183 since the switch 182 is turned OFF based on a switch control signal CW from the controller 20, or if the synchronizing signal SYc is not supplied from the synchronizing separator 181 even if the switch 182 is turned ON, the VCO 184 is controlled to be self-driven to supply the reference oscillation signal MCK having a free-running oscillation frequency to the signal generator 185. The free-running frequency of the VCO 184 is set so that the imaging signal DVb has a predetermined frame rate corresponding to the electronic viewfinder, the monitor, the camera controller 40, and the recorder/player 50 after supplying the synchronizing signal SY generated based on the reference oscillation signal MCK having the free-running frequency to the driver 112.

A user interface 21 is connected to the controller 20. Upon receiving an operation signal PSa in response to a user operation through this user interface 21, the controller 20 generates the control signal CT based on the operation signal PSa so as to control the operations of the corresponding elements. As a result, the image pickup apparatus 10 can be operated in response to the user operation.

A frame setting signal RSF for setting the frame rate of the imaging signal DVb output from the frame adder 114 can be supplied to the controller 20 through the user interface 21. For example, when the frame setting signal RSF is supplied to the controller 20 as the operation signal PSa by changing the imaging frame rate in an operation unit, or when the frame rate setting signal RSF is supplied to the controller 20 from a remote controller or an external device, the controller 20 supplies a control signal CTfp for setting the imaging frame rate to the driver 112, and also supplies a control signal CTac for setting the number of frames added to the frame adder 114.

The controller 20 also generates the selection signals CSa and CSb and the switch control signal CW based on the operation signal PSa or communication information RMc from the recorder/player 50, which is described below, so as to control the signal selection operations in the signal selectors 152 and 153 and the ON/OFF operation of the switch 182. The controller 20 also generates the communication information RMw for controlling the camera controller 40 and the recorder/player 50.

The camera controller 40 supplies the imaging signal DVb through the interface 41 to a line memory 421 of a delay compensator 42. The line memory 421 reads and writes the imaging signal DVb based on a read/write control signal RWC from a delay compensator driver 44, which is described below, and supplies the imaging signal DVb by synchronizing it with a reference synchronizing signal SYref, which is described below, to a signal selector 43 and a recording processor 51 of the recorder/player 50. The camera controller 40 also supplies the communication information RMw received by the interface 41 to a controller 55 of the recorder/player 50.

Upon receiving the image signal DVr from the recorder/player 50, the camera controller 40 supplies the image signal DVr to a line memory 422. The line memory 422 reads and writes the image signal DVr based on the read/write control signal RWC from the delay compensator driver 44, and sends the image signal DVr to the image pickup apparatus 10 from the interface 45 by predicting a delay to be generated in the transmission channel 30. Upon receiving the communication information RMc from the controller 55 of the recorder/player 50, the camera controller 40 sends the communication information RMc to the image pickup apparatus 10 through the interface 45.

The signal selector 43 provided for the camera controller 40 selects the imaging signal DVb or the playback image signal DVr based on the communication information RMw from the image pickup apparatus 10 or the communication information RMc from the recorder/player 50, and outputs the selected signal as an image signal DVm for checking the recorded image.

A switch 442 of the delay compensator driver 44 is turned ON when the image signal DVr is not supplied to the image pickup apparatus 10, and supplies the reference synchronizing signal SYref to a phase comparator 443. When the image signal DVr is supplied to the image pickup apparatus 10, the switch 442 is turned OFF to stop supplying the reference synchronizing signal SYref to the phase comparator 443. This switch 442 is controlled by the communication information RMw from the image pickup apparatus 10 or the communication information RMc from the recorder/player 50.

The phase comparator 443 compares the phase of the synchronizing signal SYd generated in a signal generator 445 with the phase of the reference synchronizing signal SYref supplied via the switch 442 so as to detect a phase error, and controls the frequency of a reference oscillation signal MCL generated in a VCO 444 so that the phase error can be eliminated. The reference oscillation signal MCL generated in the VCO 444 is supplied to the signal generator 445. The signal generator 445 generates the read/write control signal RWC based on the reference oscillation signal MCL supplied from the VCO 444.

In this case, when the image signal DVr is not supplied to the image pickup apparatus 10, or when the reference synchronizing signal SYref is supplied to the image pickup apparatus 10, the signal generator 445 generates the read/write control signal RWC based on the reference oscillation signal MCL synchronized with the reference synchronizing signal SYref, and supplies the read/write control signal RWC to the line memories 421 and 422. When the image signal DVr is supplied to the image pickup apparatus 10, the VCO 444 is self-driven. The free-running frequency of the VCO 444 is set so that the reference oscillation signal MCR having a frequency corresponding to the frame rate of the image signal DVr can be generated. The VCO 444 then generates the read/write control signal RWC based on the reference oscillation signal MCR and supplies the read/write control signal RWC to the line memory 422.

The recording processor 51 of the recorder/player 50 selects an image signal of an effective frame, which is described below, from the supplied imaging signal DVb. The recording processor 51 then performs processing, such as modulation and error correcting code (ECC) addition, on the selected image signal, so as to generate a recording signal WS and supplies it to a recording head 52W. The recording head 52W is driven by the recording signal WS so as to record the image on a recording medium 60. The image recorded on the recording medium 60 is read by a playback head 52R, and a resulting read signal RS is supplied to a playback processor 53. The Playback processor 53 performs processing, such as ECC addition and demodulation, and supplies the resulting image signal DVr to the line memory 422.

A user interface 56 is connected to the controller 55. Upon receiving an operation signal PSb in response to a user operation through this user interface 56, the controller 55 generates a control signal based on this operation signal PSb so as to control the operations of the recording processor 51, the playback processor 53, and a recording medium driver 57. As a result, the recorder/player 50 can be operated in response to the user operation.

Upon receiving the communication information RMw from the image pickup apparatus 10, the controller 55 controls the operations of the corresponding elements based on this communication information RMw. The controller 55 also generates the communication information RMc based on the operation signal PSb so as to control the image pickup apparatus 10 and the camera controller 40.

The image pickup apparatus 10 performs frame addition on the image signal DVa so as to change the frame rate of the image signal DVa. However, the frame rate of the image signal DVa may be changed by writing the image signal DVa into a RAM and by reading it at a frame rate different from that when it is written.

The operation of the image pickup system is as follows. A description is first given of the imaging operation performed at a variable frame rate by operating the user interface 21 of the image pickup apparatus 10. When the reference synchronizing signal SYref or the image signal DVr is not supplied to the image pickup apparatus 10, the VCO 184 is self-driven to generate the reference oscillation signal MCK having a free-running frequency. The signal generator 185 then generates the synchronizing signal SY based on the reference oscillation signal MCK and supplies it to the driver 112. Then, the imaging signal DVb having a frame rate determined by the synchronizing signal SY can be generated.

To generate an imaging signal synchronized with the reference synchronizing signal SYref in the image pickup apparatus 10, the reference synchronizing signal SYref is supplied to the image pickup apparatus 10 after being compensated for a delay in the line memory 422 of the camera controller 40. The image pickup apparatus 10 then extracts the reference synchronizing signal SYref by the synchronizing separator 181, and supplies it to the phase comparator 183 via the switch 182. The phase comparator 183 controls the frequency of the reference oscillation signal MCK so that the phase difference between the reference synchronizing signal SYref and the synchronizing signal SY generated in the signal generator 185 can be eliminated. As a result, the image pickup apparatus 10 can be operated in synchronization with the reference synchronizing signal SYref.

The controller 20 switches the frame rate (imaging frame rate) FRp of the imaging signal Spa generated in the image pickup unit 111 and also switches the number of frames added FA in the frame adder 114 based on the frame rate setting signal RSF input from the user interface 21. For example, as shown in FIG. 2, when the variable frame rate FRc is set as $60P \geq FRc > 30P$ by the frame rate setting signal RSF, the number of frames added FA is set to be 1 so that the imaging frame rate FRp becomes equal to the variable frame rate FRc. When the variable frame rate FRc is set as $30P \geq FRc > 20P$, the number of frames added FA is set to be 2 so that the imaging frame rate FRp is twice as high as the variable frame rate FRc. When the variable frame rate FRc is set as $20P \geq FRc > 15P$, the number of frames added FA is set to be 3 so that the imaging frame rate FRp is three times as high as the variable frame rate. FRc. Similarly, the imaging frame rate FRp and the number of frames added FA are switched.

Figure 3:
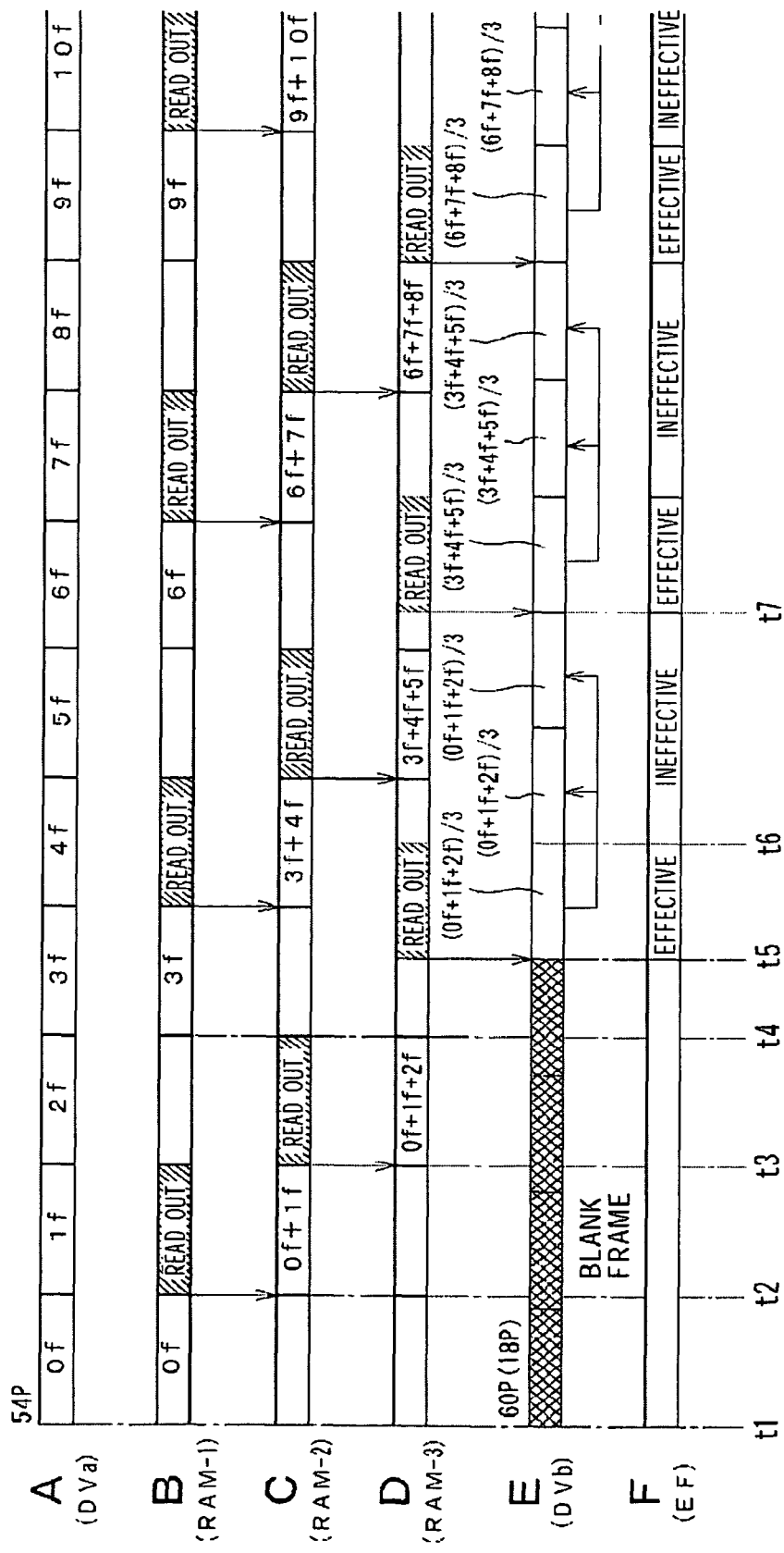
FIG. 3 illustrates the operation for generating an imaging signal DVb.

FIG. 3 illustrates the operation for generating the imaging signal DVb. For example, if the variable frame rate FRc is 18P, as shown in FIG. 2, the imaging frame rate FRp is 54P and the number of frames added FA is 3. In FIG. 3, A indicates the frames of the image signal DVa; B represents the operation of the RAM-1 forming the frame adder 114; C designates the operation of the RAM-2; D indicates the operation of the RAM-3; and E represents the frames of the imaging signal DVb. The output frame rate, which is the frame rate of the imaging signal DVb, is set to be, for example, 60P, in accordance with the device to which the imaging signal DVb is supplied.

At time t1 when the frame 0f of the image signal DVa is started, the frame adder 114 sets the RAM-1 to be the write RAM, and writes the image signal DVa of the frame 0f into the RAM-1.

At time t2 when the frame of the imaging signal DVb is started, the frame of the imaging signal DVb is set to be a blank frame since the addition of the three frames of the image signal DVa has not finished.

At time t2 when the frame 0f of the image signal DVa is finished and the frame 1f is started, the frame adder 114 sets the RAM-1 as the internal read RAM and changes the write RAM from the RAM-1 to the RAM-2. The frame adder 114 then reads out the signal of the frame 0f stored in the RAM-1, and adds it to the signal of the frame 1f and stores the resulting signal in the RAM-2.

At time t3 when the frame 1f of the image signal DVa is finished and the frame 2f is started, the frame adder 114 sets the RAM-2 to be the internal read RAM, and also changes the write RAM from the RAM-2 to the RAM-3. The frame adder 114 then reads out the signal stored in the RAM-2, and adds this signal to the signal of the frame 2f and stores the resulting signal in the RAM-3.

At time t4 when the frame 2f is finished and the frame 3f is started, the three frames of the image signal DVa have been added in the RAM-3, and thus, the RAM-3 is set to be the external read RAM. The frame adder 114 also sets the RAM-1 to be the write RAM and stores the image signal DVa of the frame 3f in the write RAM.

After generating the three-frame addition signal, at time t5 when the frame of the imaging signal DVb is started, the three-frame addition signal is read out from the external RAM, and is output as the imaging signal DVb by multiplying the level of the signal by ⅓. Also, the frame in which the imaging signal DVb is generated after reading out the three-frame addition signal from the external read RAM is set to be an effective frame.

At the start of the frame of the imaging signal DVb when the three-frame addition signal has not been written into the RAM, or when the three-frame addition signal has been read out, the imaging signal DVb of the previous frame is repeatedly used, and the current frame is set to be an ineffective frame. In this case, blank frames are not disposed between the image signals of the captured image. If a blank frame is disposed, it is set to be an ineffective frame.

Thereafter, similarly, a three-frame addition signal is generated by adding three frames of the image signal DVa by using the RAM-1 through RAM-3 and an adder. Then, by reading the three-frame addition signal at the start of a frame of the imaging signal DVb, the imaging signal DVb containing effective frames at the variable frame rate RFc can be generated. That is, the imaging signal DVb having the output frame rate 60P in accordance with the external device and containing effective images at the desired variable frame rate 18P can be generated, as indicated by E of FIG. 3. A flag EF indicating whether the frame of the imaging signal DVb is an effective frame or an ineffective frame is shown in F of FIG. 3.

A description is now given of the operation for imaging at a variable frame rate and for recording the resulting imaging signal DVb on the recording medium 60 by the recorder/player 50. In this case, the controller 20 supplies a recording start command to the recorder/player 50, which is to be controlled by the image pickup apparatus 10, as the communication information RMw. The controller 55 of the recorder/player 50 controls the recording processor 51 and the recording medium driver 57 based on the communication information RMw to select the image signals having effective frames indicated by the flag EF from the imaging signal DVb. The recording processor 51 then generates the recording signal WS based on the selected image signals and supplies the recording signal WS to the recording head 52W, and records the variable frame rate image on the recording medium 60. The controller 55 also controls the signal selector 43 of the camera controller 40, which is to be controlled by the image pickup apparatus 10, to select the imaging signal DVb and output it as the image signal DVm for checking the image.

To display the image recorded on the recording medium 60 on the monitor, the controller 20 supplies the selection signal CSb and controls the signal selector 152 to select the playback image signal DVr. To display the image on the electronic viewfinder, the controller 20 supplies the selection signal CSa and controls the signal selector 151 to select the imaging signal DVb.

The controller 20 also supplies a playback start command to the controller 55 of the recorder/player 50 as the communication information RMw. The controller 20 controls the signal selector 43 of the camera controller 40 to select the playback image signal DVr by the communication information RMw, and to output the playback image signal DVr as the image signal DVm for checking the image.

Upon receiving the playback image signal DVr from the recorder/player 50, the controller 20 allows the VCO 184 to be self-driven. For example, when supplying a playback start command to the recorder/player 50 as the communication information RMw, or when receiving the playback image signal DVr for displaying the image on the monitor and when the frame rate of this image signal DVr is different from that of the imaging signal DVb for displaying the image on the electronic viewfinder, the controller 20 turns OFF the switch 182 and allows the VCO 184 to be self-driven. The controller 20 can communicate with the controller 55 of the recorder/player 50 to determine whether the playback image signal DVr has been supplied or whether the frame rate of the playback image signal DVr is different from that of the imaging signal DVb. Alternatively, it can be determined whether the synchronizing signal has been separated in the synchronizing separator 181, and the frame rate of the separated synchronizing signal can be detected to determine whether the frame rate of the playback image signal DVr is different from that of the imaging signal DVb.

The controller 55 controls the playback processor 53 and the recording medium driver 57 based on the communication information RMw to read the signal recorded on the recording medium 60 by the playback head 52R, and supplies the read image to the playback processor 53. Then, the playback image signal DVr obtained in the playback processor 53 is supplied to the image pickup apparatus 10 via the camera controller 40. In this case, the switch 442 of the camera controller 40 is turned OFF since the playback image signal DVr is supplied to the image pickup apparatus 10, and accordingly, the VCO 444 is self-driven. Thus, a delay of the image signal DVr to be generated in the transmission channel 30 is compensated for in the line memory 422.

In the image pickup apparatus 10, the signal selector 152 selects the supplied image signal DVr and supplies it to the signal output unit 153. The signal output unit 153 supplies the playback image signal DVr to the monitor as a signal format compatible with the monitor. In this manner, the image recorded on the recording medium 60 can be displayed on the monitor.

Even if the playback image signal DVr is supplied, the switch 182 is turned OFF to allow the VCO 184 to be self-driven. Thus, the image pickup apparatus 10 is not operated in synchronization with the image signal DVr, and the imaging signal DVb having a frame rate different from the frame rate of the playback image signal DVr can be generated. If this imaging signal DVb is selected by the selector 151 and is supplied to the electronic viewfinder, the variable frame rate image can be displayed together with the image recorded on the recording medium 60.

If, for example, image signals having effective frames are selected from the imaging signal DVb having the output frame rate 60P and are recorded on the recording medium 60, and then, if this recorded image signal is played back at the frame rate 24P, the speed of the playback image becomes equal to that of the actual subject. If the subject is imaged at a frame rate higher than 24P and if the recorded subject image is played back at 24P, the speed of the playback image becomes slower. If the subject is imaged at a frame rate lower than 24P and if the recorded subject image is played back at 24P, the speed of the playback image becomes higher. On the monitor screen, the image moving at a speed in accordance with the frame rate setting signal RSF is displayed. On the electronic viewfinder, the image that is being picked up by the image pickup apparatus 10 is displayed.

As described above, even if the frame rate of the imaging signal DVb and the frame rate of the playback image signal DVr are different, a playback image based on the playback image signal DVr can be displayed on the monitor, and at the same time, the imaging signal DVb can be generated, and the variable frame rate image based on the imaging signal DVb can be displayed on the electronic viewfinder. This enables the operator to conduct image frame adjustment or focus adjustment by using the variable frame rate image displayed on the electronic viewfinder while checking the recorded image on the monitor.

If the playback image signal DVr is selected by the signal selector 151 and if the imaging signal DVb is selected by the signal selector 152, the image recorded on the recording medium 60 can be displayed on the electronic viewfinder, and also, the variable frame rate image can be displayed on the monitor.

A description is now given of the case where the camera controller 40 or the recorder/player 50 is used as a control unit. In this case, by operating the user interface 56 of the recorder/player 50, the frame rate of the variable frame rate image can be changed and the image recorded on the recording medium 60 can be checked.

The controller 55 controls the operations of the recording processor 51, the playback processor 53, and the recording medium driver 57 based on the operation signal PSb from the user interface 56 to select and record image signals having effective frames from the supplied imaging signal DVb. The controller 55 also reads the signal recorded on the recording medium 60 and supplies the playback image signal DVr to the image pickup apparatus 10. When the frame rate of the image that is being captured is changed, the controller 55 also supplies the communication information RMc indicating the changed frame rate to the controller 20 of the image pickup apparatus 10. The controller 55 may also supply setting information CP indicating the image to be displayed on the electronic viewfinder or the monitor to the controller 20 as the communication information RMc.

The controller 20 controls the frame rate of the imaging signal Spa and the number of frames added FA in the frame adder 114 so that the frame rate of the image that is being captured becomes equal to the frame rate represented by the communication information RMc. Upon receiving the setting information CP, the controller 20 generates the selection signals CSa and CSb based on this setting information CP and controls the operations of the signal selectors 151 and 152.

Upon receiving the playback image signal DVr as a result of performing playback in the recorder/player 50, the controller 20 allows the VCO 184 of the synchronizing signal generator 18 to be self-driven to generate the synchronizing signal. For example, if the playback image signal DVr is supplied to the image pickup apparatus 10 and if the frame rate of the playback image signal DVr is different from that of the imaging signal DVb supplied from the image pickup apparatus 10, the controller 20 turns OFF the switch 182 by the communication information RMc to allow the VCO 184 to be self-driven.

Accordingly, while displaying the image recorded on the recording medium 60 by controlling the operation of the image pickup apparatus 10 according to the operation of the recorder/player 50, the image which is being picked up by the image pickup apparatus 10 can be displayed.

Figure 4:
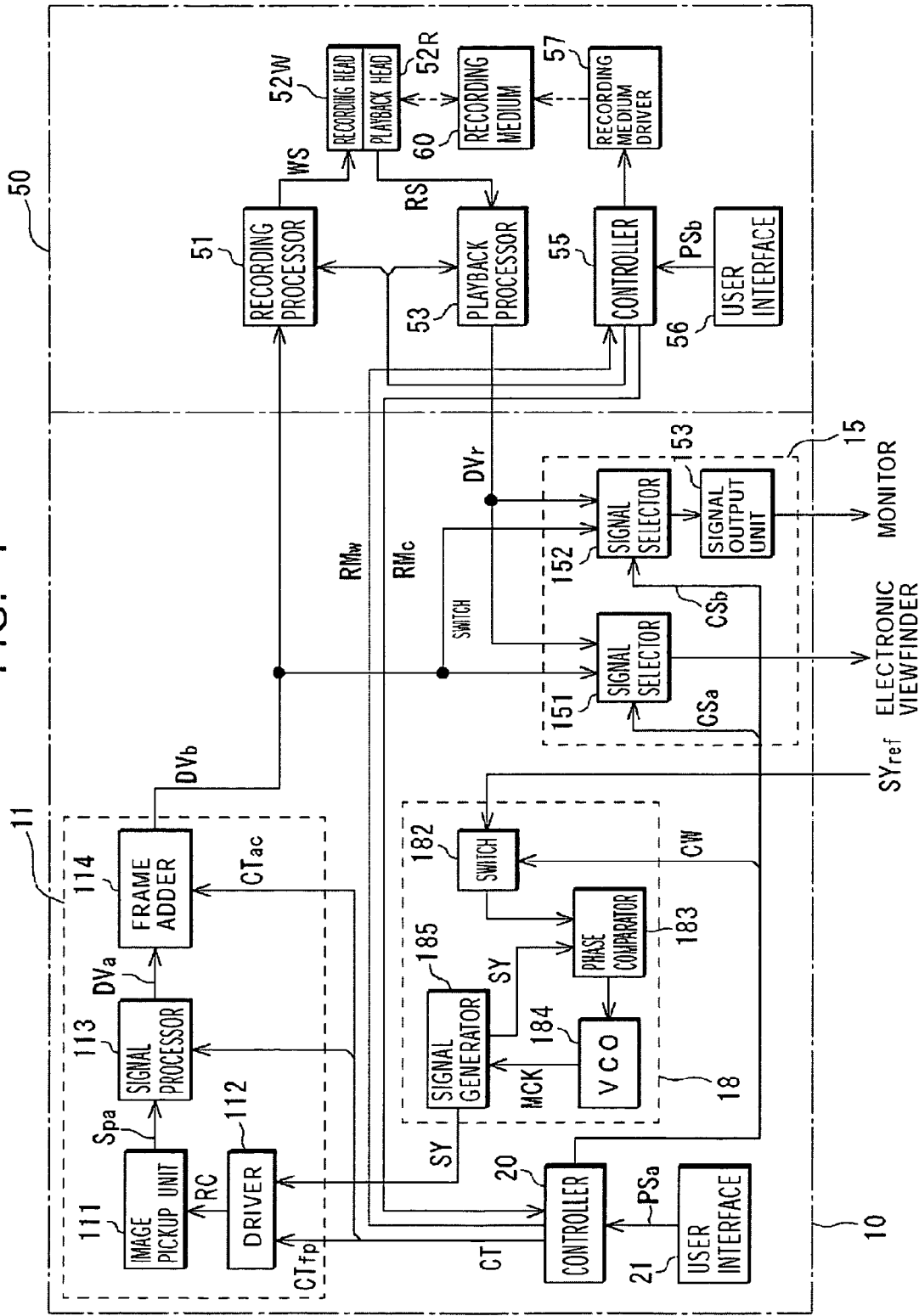
FIG. 4 is a block diagram illustrating another example of the configuration of the image pickup system.

In the above-described image pickup system, the camera controller 40 and the recorder/player 50 form a control unit for controlling the image pickup apparatus 10. Alternatively, the image pickup apparatus 10 and the recorder/player 50 may be integrated into an image pickup system. An example of the configuration of such a modification is shown in FIG. 4. In FIG. 4, elements corresponding to those of FIG. 1 are designated with like reference numerals, and a detailed explanation thereof is thus omitted.

The imaging signal DVb output from the frame adder 114 is supplied to the signal selectors 151 and 152 of the monitor output unit 15 and to the recording processor 51. The playback image signal DVr output from the playback processor 53 is also supplied to the signal selectors 151 and 152.

The reference synchronizing signal SYref from an external device is supplied to the phase comparator 183 via the switch 182.

The operation signal PSa or PSb indicating that the image recorded on the recording medium 60 is to be displayed on one of the electronic viewfinder and the monitor, and that the image which is being picked up by the image pickup apparatus 10 is to be displayed on the other display device is supplied from the user interface 21 or 56. In this case, as stated above, the selection signals CSa and CSb according to the operation signal PSa or PSb are generated in the controller 20 and are supplied to the signal selectors 151 and 152. The signal selectors 151 and 152 then select the image signal to be displayed on the electronic viewfinder or the monitor. To generate the imaging signal DVb synchronized with the reference synchronizing signal SYref, the switch 182 is turned ON by the switch control signal CW from the controller 20 so as to synchronize the VCO 184 with the reference synchronizing signal SYref. To display the image recorded on the recording medium 60, the switch 182 is turned OFF by the switch control signal CW from the controller 20 so as to allow the VCO 184 to be self-driven. As a result, the imaging signal DVb having a frame rate in accordance with the free-running frequency of the VCO 184 can be generated. If the controller 55 and the user interface 56 are not provided for the recorder/player 50, the operation of the recorder/player 50 is controlled by the communication information RMw from the controller 20.

As described above, in the image pickup system formed of the image pickup apparatus 10 and the recorder/player 50, the variable frame rate image can be displayed even while the image recorded on the recording medium 60 having a frame rate different from that of the variable frame rate image is being displayed.

What is claimed is:

1. An image pickup apparatus comprising:
   first and second display portions;
   an image signal generating portion for generating a first image signal representing a variable frame rate image; and
   a synchronizing signal generating portion for generating a synchronizing signal used for generating the first image signal,
   wherein, when the synchronizing signal generating portion receives, from a source which is external to the image pickup apparatus, a second image signal having a frame rate different from a frame rate of the first image signal, the synchronizing signal generating portion is self-driven to generate the synchronizing signal for generating the first image signal,
   wherein the image pickup apparatus is not operated in synchronization with the received second image signal, and
   wherein the first image signal is displayed on the first display portion and the received second image signal is displayed on the second display portion.

2. The image pickup apparatus according to claim 1, wherein, when receiving a reference synchronizing signal instead of the second image signal, the synchronizing signal generating portion generates the synchronizing signal in synchronization with the reference synchronizing signal.

3. An image pickup apparatus comprising:
   first and second display portions;
   an image signal generating portion for generating a first image signal representing a variable frame rate image;
   a synchronizing signal generating portion for generating a synchronizing signal used for generating the first image signal; and
   a controller for controlling operations of the image signal generating portion and the synchronizing signal generating portion,
   wherein, when the synchronizing signal generating portion receives a second image signal from a source which is external to the image pickup apparatus, the controller allows the synchronizing signal generating portion to be self-driven to generate the synchronizing signal for the first image signal,
   wherein the image pickup apparatus is not operated in synchronization with the received second image signal and
   wherein the first image signal is displayed on the first display portion and the received second image signal is displayed on the second display portion.

4. The image pickup apparatus according to claim 3, wherein, when a frame rate of the first image signal is different from a frame rate of the second image signal supplied from the external source, the controller allows the synchronizing signal generating portion to be self-driven.

5. The image pickup apparatus according to claim 3, wherein, when receiving a reference synchronizing signal instead of the second image signal, the controller controls the synchronizing signal generating portion to be operated in synchronization with the reference synchronizing signal.

6. An image pickup apparatus for use in an image pickup system comprising the image pickup apparatus and a unit to be controlled by the image pickup apparatus, the image pickup apparatus comprising:
   first and second display portions;
   an image signal generating portion for generating a first image signal representing a variable frame rate image;
   a synchronizing signal generating portion for generating a synchronizing signal used for generating the first image signal and for supplying the synchronizing signal to the image signal generating portion; and
   a controller for controlling operations of the image signal generating portion, the synchronizing signal generating portion, and the unit to be controlled,
   wherein the controller controls the unit to be controlled to supply a second image signal to the image pickup apparatus and when the second image signal is supplied to the synchronizing signal generating portion, the controller allows the synchronizing signal generating portion to be self-driven to generate the synchronizing signal for the first image signal,
   wherein the image pickup apparatus is not operated in synchronization with the received second image signal and
   wherein the first image signal is displayed on the first display portion and the received second image signal is displayed on the second display portion.

7. The image pickup apparatus according to claim 6, wherein, when a frame rate of the first image signal is different from a frame rate of the second image signal supplied from the unit to be controlled, the controller allows the synchronizing signal generating portion to be self-driven.

8. The image pickup apparatus according to claim 6, wherein, when receiving a reference synchronizing signal instead of the second image signal from the unit to be controlled, the controller controls the synchronizing signal generating portion to be operated in synchronization with the reference synchronizing signal.

9. The image pickup apparatus according to claim 6, wherein:
   the unit to be controlled comprises a delay compensating portion for compensating for a delay to be generated during communication with the image pickup apparatus and a delay compensation driving portion for generating a drive signal for driving the delay compensating portion; and
   when receiving the second image signal from the unit to be controlled, the controller allows the delay compensation driving portion of the unit to be controlled to be self-driven to generate the drive signal corresponding to a frame rate of the second image signal.

10. The image pickup apparatus according to claim 9, wherein, when receiving a reference synchronizing signal instead of the second image signal from the unit to be controlled, the controller controls the delay compensation driving portion to generate the drive signal synchronized with the reference synchronizing signal.

11. The image pickup apparatus according to claim 6, wherein the controller controls a frame rate of the second image signal supplied from the unit to be controlled.

12. A control unit for use in an image pickup system comprising: an image pickup apparatus including first and second display portions, an image signal generating portion for generating a first image signal representing a variable frame rate image and a synchronizing signal generating portion for generating a synchronizing signal for operating the image signal generating portion; and the control unit for controlling the image pickup apparatus, the control unit comprising:

a controller for controlling operations of the image signal generating portion and the synchronizing signal generating portion of the image pickup apparatus, wherein the controller allows the synchronizing signal generating portion to be self-driven to generate the synchronizing signal for the first image signal when supplying a second image signal to the synchronizing signal generating portion of the image pickup apparatus, wherein the image pickup apparatus is not operated in synchronization with the supplied second image signal and the first image signal is displayed on the first display portion and the supplied second image signal is displayed on the second display portion.

13. The control unit according to claim 12, wherein, when a frame rate of the first image signal is different from a frame rate of the second image signal supplied to the image pickup apparatus, the controller allows the synchronizing signal generating portion to be self-driven to generate the synchronizing signal.

14. The control unit according to claim 12, wherein, when supplying a reference synchronizing signal instead of the second image signal to the image pickup apparatus, the controller controls the synchronizing signal generating portion to be operated in synchronization with the reference synchronizing signal.

15. The control unit according to claim 12, further comprising:

a delay compensating portion for compensating for a delay to be generated during communication with the image pickup apparatus; and a delay compensation driving portion for generating a drive signal for driving the delay compensating portion;

wherein, when supplying the second image signal to the image pickup apparatus, the controller allows the delay compensation driving portion to be self-driven to generate the drive signal corresponding to a frame rate of the second image signal.

16. The control unit according to claim 15, wherein, when supplying a reference synchronizing signal instead of the second image signal to the image pickup apparatus, the controller controls the delay compensation driving portion to generate the drive signal synchronized with the reference synchronizing signal.

* * * * *